(12) United States Patent
Oohashi et al.

(10) Patent No.: US 6,617,718 B2
(45) Date of Patent: Sep. 9, 2003

(54) AUTOMOTIVE ALTERNATOR

(75) Inventors: Atsushi Oohashi, Tokyo (JP);
Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/962,341

(22) Filed: Sep. 26, 2001

(65) Prior Publication Data

US 2002/0093270 A1 Jul. 18, 2002

(30) Foreign Application Priority Data

Jan. 16, 2001 (JP) .................................... 2001-007925

(51) Int. Cl.⁷ ................................................ H02K 9/00
(52) U.S. Cl. .......................................... 310/62; 310/63
(58) Field of Search ..................... 320/58, 60 R, 320/62, 63

(56) References Cited

U.S. PATENT DOCUMENTS

| 4,908,541 | A | * | 3/1990 | Kawazoe et al. | 310/270 |
| 5,325,003 | A | * | 6/1994 | Saval et al. | 310/43 |
| 5,705,865 | A | * | 1/1998 | Ishida et al. | 310/62 |
| 5,955,810 | A | * | 9/1999 | Umeda et al. | 310/208 |
| 6,091,169 | A | * | 7/2000 | Umeda et al. | 310/62 |

FOREIGN PATENT DOCUMENTS

JP 4-26345 1/1992

* cited by examiner

*Primary Examiner*—Dang Le
(74) *Attorney, Agent, or Firm*—Sughrue Mion, PLLC

(57) ABSTRACT

Centrifugal fans are fixed to axial end surfaces of first and second pole cores such that $0.2 < t/h < 0.7$, where t is an amount of axial protrusion of the centrifugal fans relative to apex portions of front-end and rear-end coil end groups of a stator winding and h is an axial height of the centrifugal fans.

7 Claims, 9 Drawing Sheets

AUTOMOTIVE ALTERNATOR

This application is based on Application No. 2000-007925, filed in Japan on Jan. 16, 2001, the contents of which are hereby incorporated by reference.

BACKGROUND OF THE INVENTION

1. Field of the Invention

The present invention relates to an automotive alternator and particularly to a positional relationship between a cooling fan and a stator winding.

2. Description of the Related Art

FIG. 10 is a cross section showing a conventional automotive alternator.

In FIG. 10, the automotive alternator includes: a case 3 constituted by an aluminum front bracket 1 and an aluminum rear bracket 2; a shaft 6 disposed inside the case 3 having a pulley 4 secured to a first end thereof; a Lundell-type rotor 7 secured to the shaft 6; front-end and rear-end centrifugal fans 5 functioning as cooling fans secured to front and rear axial end surfaces of the rotor 7; a stator 8 secured to the case 3 so as to envelop the rotor 7; slip rings 9 secured to a second end of the shaft 6 for supplying electric current to the rotor 7; a pair of brushes 10 sliding on surfaces of the slip rings 9; a brush holder 11 accommodating the brushes 10; a rectifier 12 electrically connected to the stator 8 for converting alternating current generated in the stator 8 into direct current; and a regulator 18 mounted to a regulator heat sink 17 fitted onto the brush holder 11, the regulator 18 adjusting the magnitude of an alternating voltage generated in the stator 8.

The rotor 7 is constituted by a field winding 13 for generating a magnetic flux on passage of an electric current, and a pair of first and second pole cores 20 and 21 disposed so as to cover the field winding 13, magnetic poles being formed in the first and second pole cores 20 and 21 by magnetic flux generated in the field winding 13. The pair of first and second pole cores 20 and 21 are made of iron, each has a plurality of first and second claw-shaped magnetic poles 22 and 23 having a generally trapezoidal outermost diameter surface shape disposed on an outer circumferential edge portion at even angular pitch in a circumferential direction so as to project axially, and the first and second pole cores 20 and 21 are fixed to the shaft 6 facing each other such that the first and second claw-shaped magnetic poles 22 and 23 intermesh.

The stator 8 is constituted by: a cylindrical stator core 15 formed by laminating a magnetic steel plate; and a stator winding 16 installed in the stator core 15. The stator 8 is held between the front bracket 1 and the rear bracket 2 so as to form a uniform air gap between outer circumferential surfaces of the claw-shaped magnetic poles 22 and 23 and an inner circumferential surface of the stator core 15.

The rectifier 12 is constituted by: unidirectional conducting component packages 24 for three-phase full-wave rectification of output from the stator winding 16; a pair of rectifier heat sinks 25; and a circuit board 26 in which wiring constituting a bridge circuit is insert molded. The unidirectional conducting component packages 24 are each formed into a generally rectangular parallelepiped shape by molding a diode 24a joined to a heat-dissipating tab 24b into an electrically-insulating resin portion 24c. A predetermined number of the unidirectional conducting component packages 24 are mounted to each of the rectifier heat sinks 25 by joining the heat-dissipating tabs 24b to a main surface of each of the rectifier heat sinks 25.

In an automotive alternator constructed in this manner, an electric current is supplied from a battery (not shown) through the brushes 10 and the slip rings 9 to the field winding 13, generating a magnetic flux. The first claw-shaped magnetic poles 22 on the first pole core 20 are magnetized into North-seeking (N) poles by this magnetic flux, and the second claw-shaped magnetic poles 23 on the second pole core 21 are magnetized into South-seeking (S) poles.

At the same time, the pulley 4 is driven by an engine and the rotor 7 is rotated by the shaft 6. A rotating magnetic field is applied to the stator core 15 due to the rotation of the rotor 7, generating an electromotive force in the stator winding 16. The alternating electromotive force generated in the stator winding 16 is converted into direct current by the rectifier 12 and the magnitude of the voltage output therefrom is adjusted by the regulator 18, recharging the battery.

Now, the field winding 13, the stator winding 16, the rectifier 12, and the regulator 18 continuously generate heat during power generation, and in an automotive alternator having a rated output current in the 100A class, the amount of heat generated at rotational frequencies at which the temperature is high is 60W, 500W, 120W, and 6W, respectively.

Thus, in order to cool the heat generated by power generation, front-end and rear-end air intake apertures 1a and 2a are disposed through axial end surfaces of the front bracket 1 and the rear bracket 2, and front-end and rear-end air discharge apertures 1b and 2b are disposed through radial side surfaces of the front bracket 1 and the rear bracket 2 so as to face coil end groups 16f and 16r of the stator winding 16.

Thus, the centrifugal fans 5 are rotated and driven together with the rotation of the rotor 7, and front-end and rear-end cooling airflow channels are formed in which external air is sucked inside the case 3 through the front-end and rear-end air intake apertures 1a and 2a, flows axially towards the rotor 7, is then deflected centrifugally by the centrifugal fans 5, thereafter crosses the coil end groups 16f and 16r, and is discharged outside through the front-end and rear-end air discharge apertures 1b and 2b. A rotor cooling airflow channel is also formed in which a cooling airflow flows through the inside of the rotor 7 from a front end to a rear end as a result of a pressure difference between the front end and the rear end of the rotor 7.

As a result, heat generated in the stator winding 16 is dissipated from the coil end groups 16f and 16r to the front-end and rear-end cooling airflows, suppressing temperature increases in the stator 8. Furthermore, heat generated in the diodes 24a and the regulator 18 is dissipated to the rear-end cooling airflow through the rectifier heat sinks 25 and the regulator heat sink 17, suppressing temperature increases in the rectifier 12 and the regulator 18. In addition, heat generated in the field winding 13 is dissipated to the rotor cooling airflow flowing through the rotor 7, thereby suppressing temperature increases in the rotor 7.

In the automotive alternator constructed in this manner, heat-generating parts such as the stator 8, the rectifier 12, etc., are cooled by the cooling airflows flowing through the cooling airflow channels formed by the centrifugal fans 5.

Here, inflow flow rates of the cooling airflows flowing through the cooling airflow channels depend on ventilation resistance in the cooling airflow channels, the inflow flow rates decreasing as ventilation resistance increases. This decrease in the inflow flow rates of the cooling airflows causes a decrease in cooling of the rectifier 12 and the regulator 18. Furthermore, an amount of overlap between the front-end centrifugal fan 5 and the front-end coil end group 16*f* and between the rear-end centrifugal fan 5 and the rear-end coil end group 16*r* (an axial length of radial overlap between the two in each case) is one of the factors increasing ventilation resistance in the cooling airflow channels. In other words, if the amount of overlap increases, ventilation resistance increases. Cooling of the stator winding 16 is raised as the amount of overlap increases.

Thus, increasing the amount of overlap between the front-end centrifugal fan 5 and the front-end coil end group 16*f* and between the rear-end centrifugal fan 5 and the rear-end coil end group 16*r* leads to improved cooling of the stator winding 16, but causes decreased cooling of the rectifier 12 and the regulator 18.

However, one conventional problem has been that temperatures increase excessively either in the stator winding 16 or in the rectifier 12 and the regulator 18 because the amount of overlap between the front-end centrifugal fan 5 and the front-end coil end group 16*f* and between the rear-end centrifugal fan 5 and the rear-end coil end group 16*r* has been set in consideration either of cooling the rectifier 12 and the regulator 18 or of cooling the stator winding 16, but not both.

In view of these conditions, the present applicants have focused on the stator winding 16 and the rectifier 12, both of which are large heat-generating parts, and investigated problems accompanying temperature increases in the stator winding 16 and the rectifier 12.

Excessive increases in the temperature of the stator winding 16 lead to softening of a varnish impregnated in the stator winding 16. As a result, the stator winding 16 rubs against the stator core 15 due to vibration, damaging an electrically-insulating coating on conductor wires of the stator winding 16, thereby decreasing electrical insulation.

Similarly, excessive increases in the temperature of the rectifier 12 cause heat degradation in the diodes 24*a* of the rectifier 12, shortening the life of the diodes 24*a*.

SUMMARY OF THE INVENTION

The present invention aims to solve the above problems and an object of the present invention is to provide an automotive alternator enabling the working life of diodes of a rectifier to be extended and deterioration in electrical insulation to be eliminated by setting an amount of overlap between a cooling fan and a coil end group of a stator winding in consideration of a softening temperature of a varnish impregnated into the stator winding and of a heat tolerance threshold of the diodes.

In order to achieve the above object, according to one aspect of the present invention, there is provided an automotive alternator including:

a shaft rotatably supported by a case;

a rotor fixed to the shaft;

a stator provided with:

a cylindrical stator core supported by the case so as to envelop the rotor, a plurality of slots extending axially being formed in the stator core so as to line up circumferentially; and a stator winding installed in the stator core;

a rectifier supported by the case so as to face an axial end surface of the rotor; and at least one cooling fan fixed to at least one axial end surface of the rotor, wherein the cooling fan is constructed such that a ratio (t/h) between an amount of axial protrusion t of the cooling fan relative to an apex portion of a coil end group of the stator winding and an axial height h of the cooling fan satisfies an expression $0.2 < t/h < 0.7$.

A gap may be formed between the coil end group of the stator winding and an end surface of the stator core, the gap being positioned closer to an axially-central region than the end surface of the rotor to which the cooling fan is fixed.

Each of winding phase portions constituting the stator winding may be constructed by a divided winding portion.

The cooling fan may be formed so as to have a smaller outside diameter than an outside diameter of the rotor.

An intersecting region between an axial end surface of the rotor and an outer circumferential surface of the rotor may be chamfered.

The cooling fans may be fixed to first and second axial end surfaces of the rotor, the cooling fan fixed to the first axial end surface of the rotor being a centrifugal fan, and the cooling fan fixed to the second axial end surface of the rotor being a mixed-flow fan.

The slots may be disposed at a ratio of two per phase per pole.

DETAILED DESCRIPTION OF THE PREFERRED EMBODIMENTS

The preferred embodiments of the present invention will now be explained with reference to the drawings.

Embodiment 1

Figure 1:
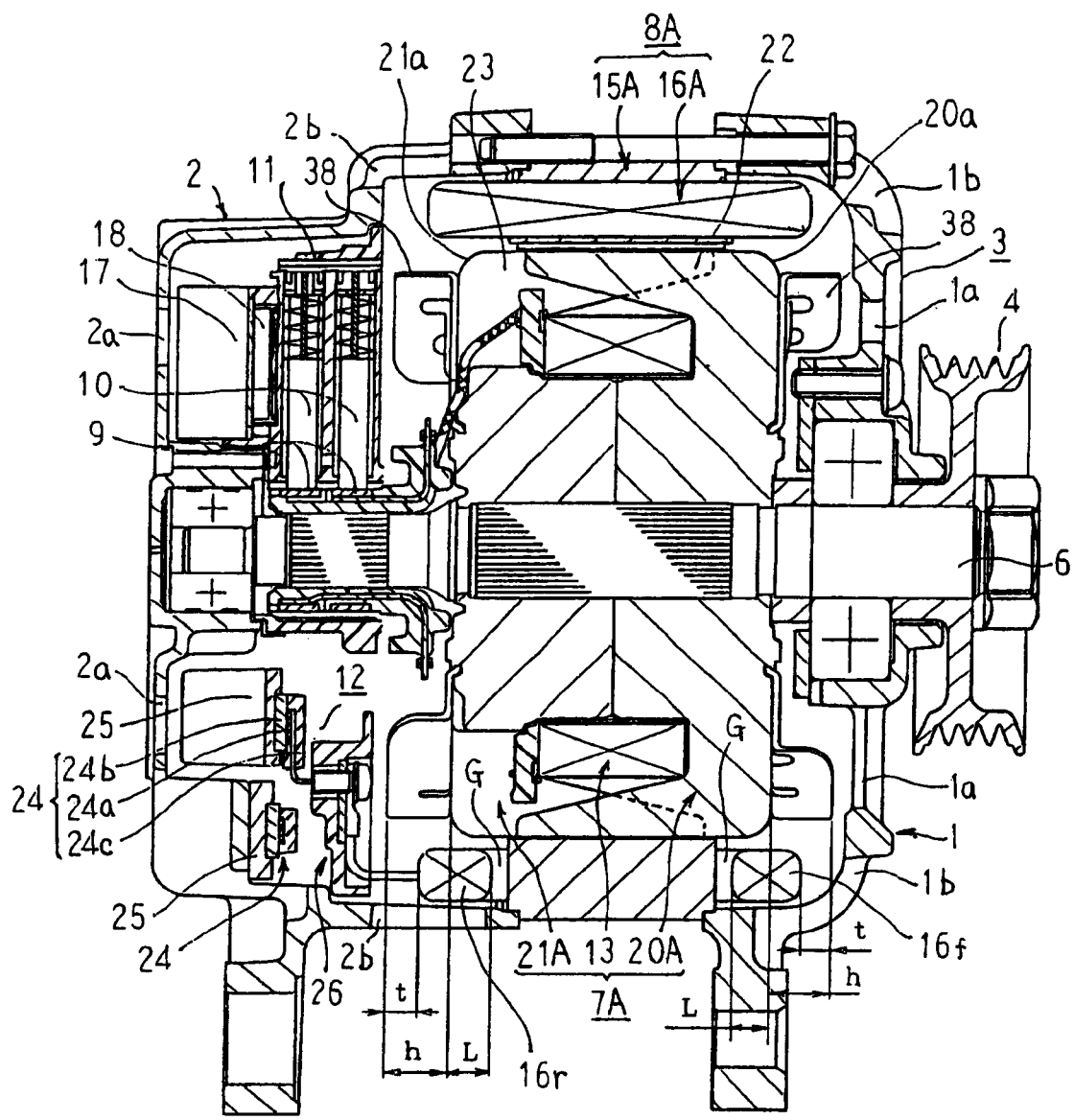
FIG. 1 is a cross section showing an automotive alternator according to Embodiment 1 of the present invention.
Figure 2:
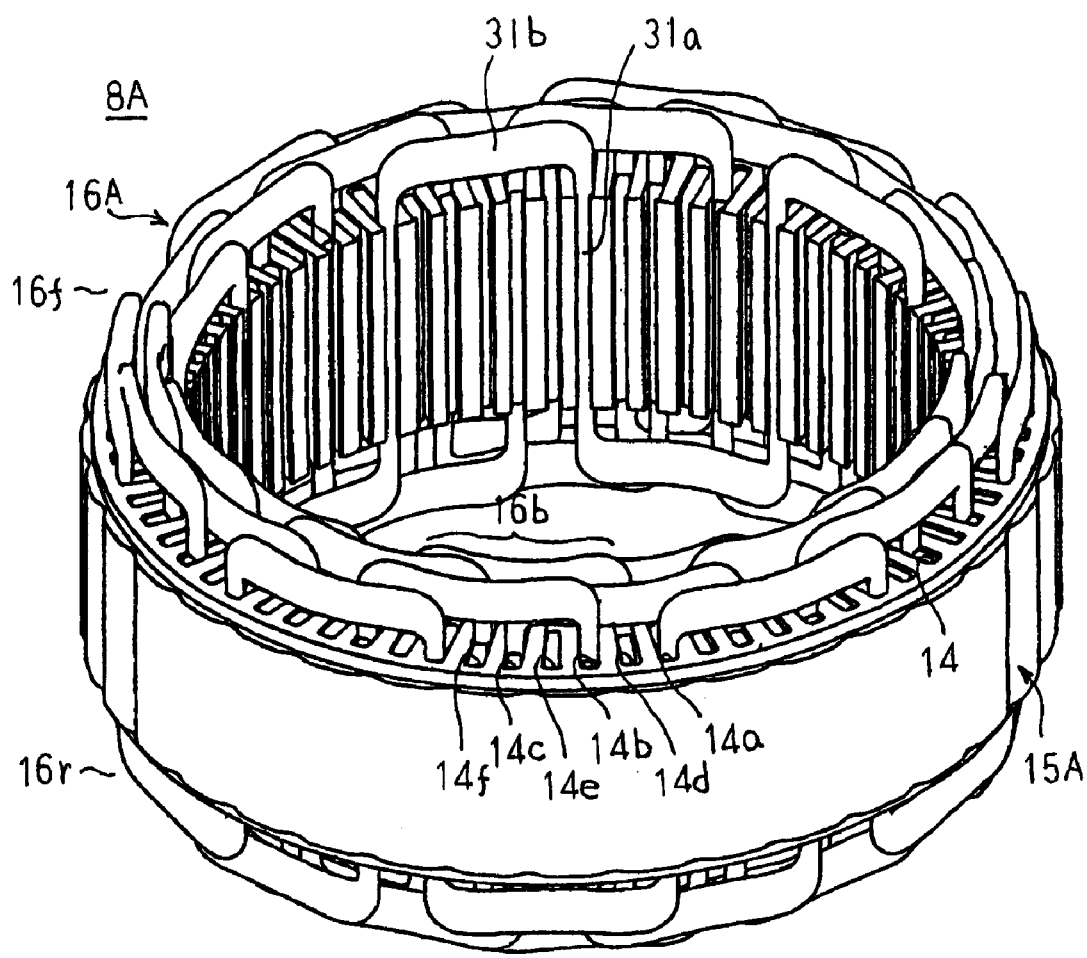
FIG. 2 is a perspective showing a stator of the automotive alternator according to Embodiment 1 of the present invention.
Figure 3:
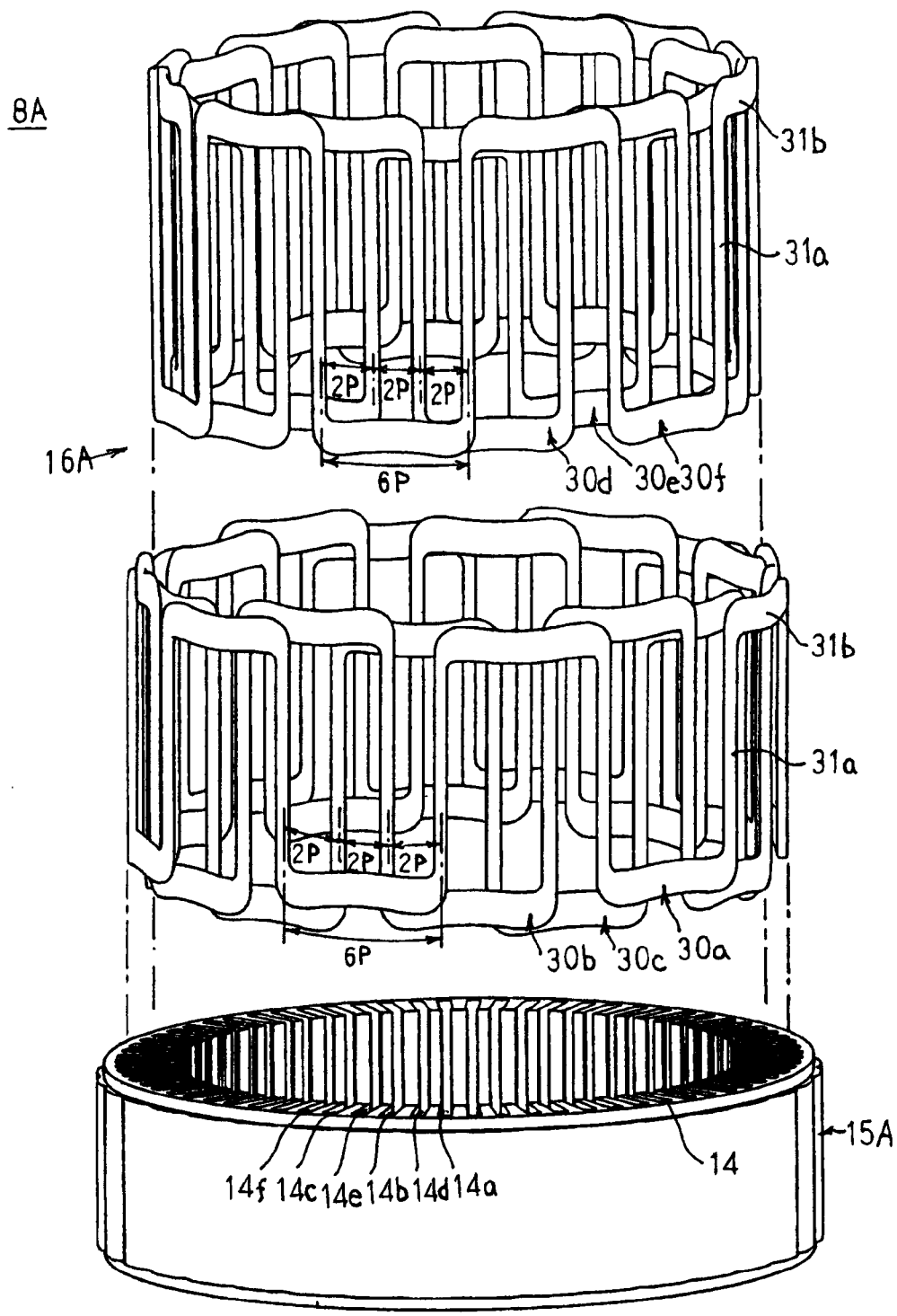
FIG. 3 is an exploded perspective showing the stator of the automotive alternator according to Embodiment 1 of the present invention.
Figure 4:
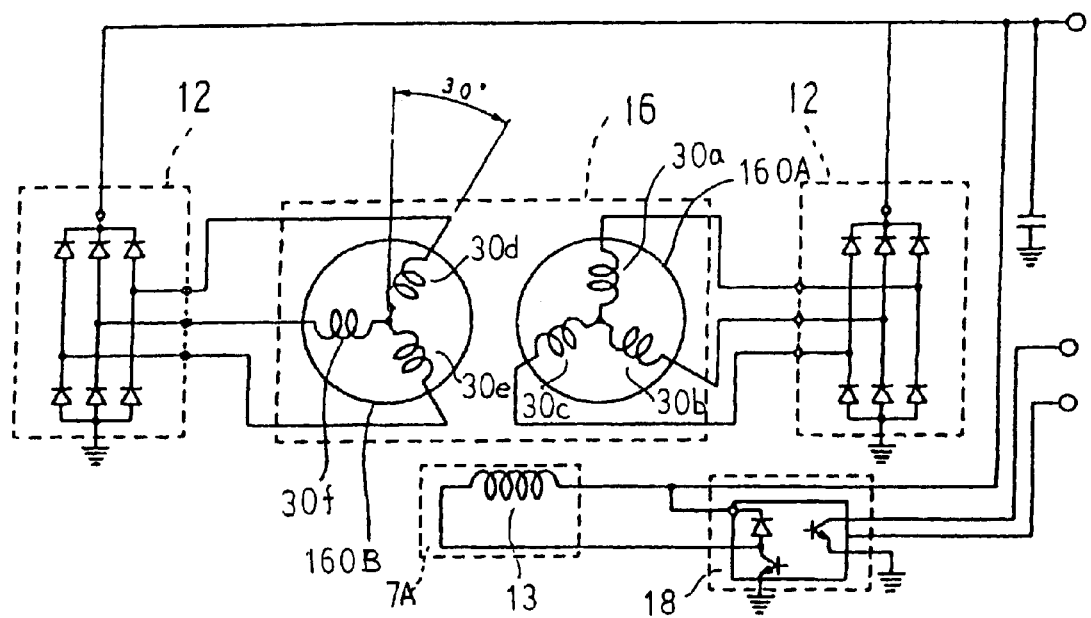
FIG. 4 is a circuit diagram showing an electrical circuit in the automotive alternator according to Embodiment 1 of the present invention.

FIG. 1 is a cross section showing an automotive alternator according to Embodiment 1 of the present invention, FIG. 2 is a perspective showing a stator of the automotive alternator according to Embodiment 1 of the present invention, FIG. 3 is an exploded perspective showing the stator of the automotive alternator according to Embodiment 1 of the present invention, and FIG. 4 is a circuit diagram showing an electrical circuit in the automotive alternator according to Embodiment 1 of the present invention.

In FIG. 1, a rotor 7A is constituted by a field winding 13 for generating magnetic flux on passage of an electric current, and a pair of first and second pole cores 20A and 21A disposed so as to cover the field winding 13, magnetic poles being formed in the first and second pole cores 20A and 21A by magnetic flux generated in the field winding 13. The pair of first and second pole cores 20A and 21A are made of iron, each has a plurality of first and second claw-shaped magnetic poles 22 and 23 having a generally trapezoidal outermost diameter surface shape disposed on an outer circumferential edge portion at even angular pitch in a circumferential direction so as to project axially, intersecting regions between axial end surfaces and outer circumferential surfaces of the first and second pole cores 20A and 21A are chamfered into a curved shape to form first and second shoulder portions 20a and 21a, and the first and second pole cores 20A and 21A are fixed to a shaft 6 facing each other such that the first and second claw-shaped magnetic poles 22 and 23 intermesh.

Front-end and rear-end centrifugal fans 38 functioning as cooling fans are fixed to the axial end surfaces of the first and second pole cores 20A and 21A such that the outside diameters of the centrifugal fans 38 are generally aligned with boundary portions between the axial end surfaces of the first and second pole cores 20A and 21A and the first and second shoulder portions 20a and 21a.

A stator 8A is constituted by: a cylindrical stator core 15A formed by laminating a magnetic steel plate; and a stator winding 16A installed in the stator core 15A. The stator 8A is held between the front bracket 1 and the rear bracket 2 so as to form a uniform air gap between outer circumferential surfaces of the claw-shaped magnetic poles 22 and 23 and an inner circumferential surface of the stator core 15A.

Here, a ratio (t/h) between an amount of axial protrusion t of the centrifugal fans 38 relative to apex portions of front-end and rear-end coil end groups 16f and 16r of the stator winding 16A and an axial height h of the centrifugal fans 38 is 0.5.

Figure 10:
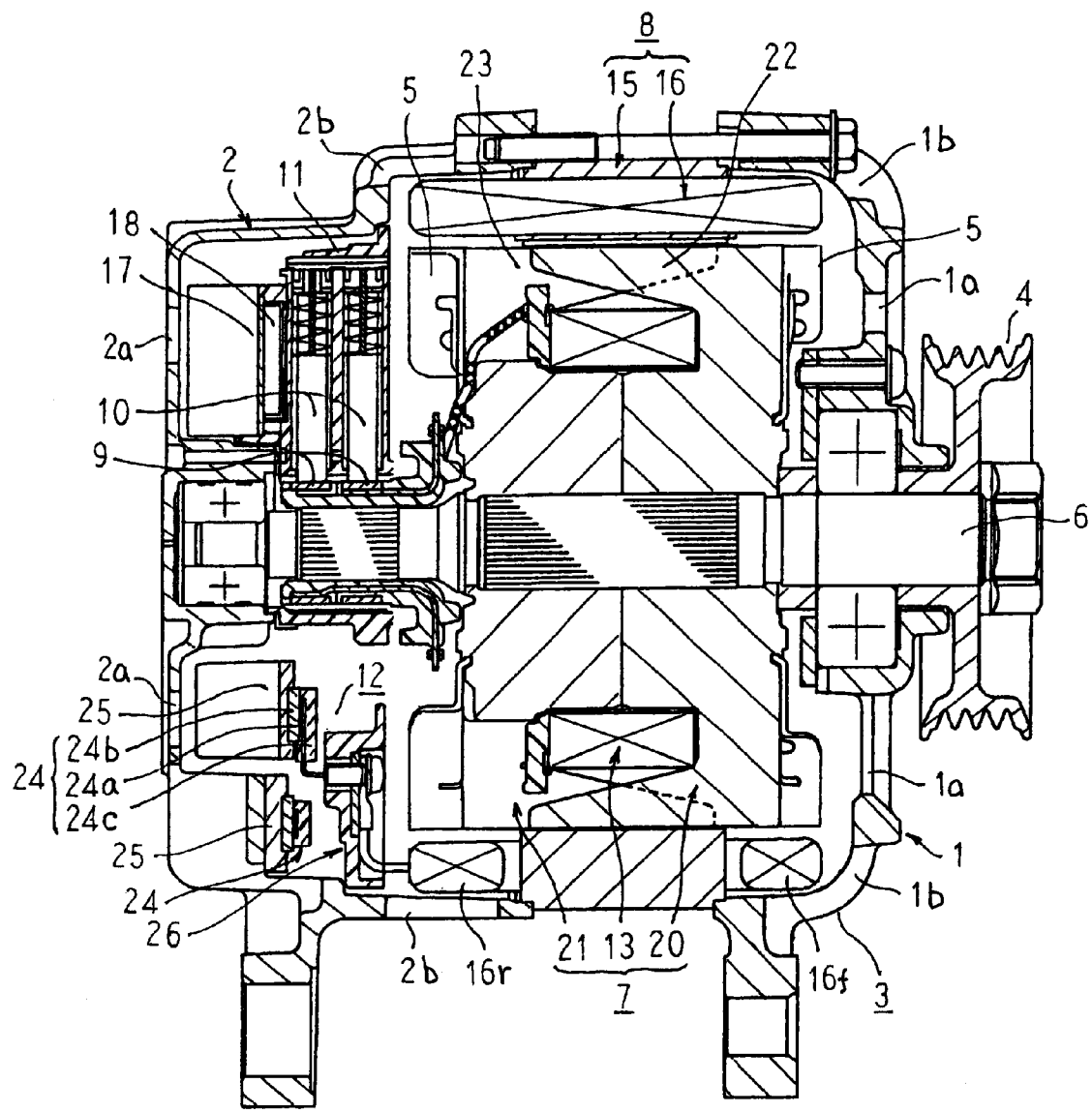
FIG. 10 is a cross section showing a conventional automotive alternator.

Moreover, the rest of the embodiment is constructed in a similar manner to the conventional automotive alternator shown in FIG. 10.

Next, a construction of the stator 8A will be explained with reference to FIGS. 2 to 3.

Slots 14 extending axially are disposed in the stator core 15A at an even angular pitch (a pitch corresponding to an electrical angle of 30°) in a circumferential direction at a ratio of two per phase per pole. In other words, for twelve claw-shaped magnetic poles 22 and 23 in the rotor 7A, seventy-two slots 14 are disposed in the stator core 15A so as to obtain the stator winding 16A, which is composed of first and second three-phase alternating-current windings.

Here, the slots 14 are disposed in order of an a-phase slot 14a, a d-phase slot 14d, a b-phase slot 14b, an e-phase slot 14e, a c-phase slot 14c, and an f-phase slots 14f repeatedly in a circumferential direction. Moreover, the slots 14 in each phase are disposed at a pitch of six slots.

An a-phase winding phase portion 30a is constructed into a wave winding in which a conductor wire composed of a continuous copper wire coated with electrical insulation is wound for a predetermined number of winds, the a-phase winding phase portion 30a being formed into a wave-shaped pattern composed of twelve slot-housed portions 31a disposed at a pitch of six slots (6P) in a circumferential direction and linking portions 31b linking together end portions of adjacent pairs of the slot-housed portions 31a alternately at first and second axial ends, as shown in FIG. 3. The a-phase winding phase portion 30a is installed in the stator core 15A such that the slot-housed portions 31a are housed in the respective a-phase slots 14a disposed at the pitch of six slots. The linking portions 31b linking together the end portions of the adjacent pairs of the slot-housed portions 31a extend circumferentially axially outside the stator core 15A, constituting coil ends. Furthermore, b-phase, c-phase, d-phase, e-phase, and f-phase winding phase portions 30b, 30c, 30d, 30e, and 30f are constructed in a similar manner.

The a-phase, b-phase, and c-phase winding phase portions 30a, 30b, and 30c are installed in the stator core 15A so as to be circumferentially offset from each other by a pitch of two slots (2P) and stacked in three layers radially. Similarly, the f-phase, d-phase, and e-phase winding phase portions 30f, 30d, and 30e are installed in the stator core 15A so as to be circumferentially offset from each other by a pitch of two slots, to be stacked in three layers radially, and to be positioned on an inner circumferential side of the a-phase, b-phase, and c-phase winding phase portions 30a, 30b, and 30c.

Thus, as shown in FIG. 2, the stator 8A is obtained, in which the six winding phase portions 30a to 30f are installed in the stator core 15A so as to be stacked in six layers radially. The coil ends (the linking portions 31b) of the six winding phase portions 30a to 30f constitute the front-end and rear-end coil end groups 16f and 16r of the stator winding 16A. Furthermore, portions of the coil ends extending circumferentially relative to the stator core 15A form front-end and rear-end crossover portions 16b, and gaps G are formed between the front-end and rear-end crossover portions 16b and front-end and rear-end end surfaces of the stator core 15A. Moreover, although not shown, a varnish is impregnated inside the slots 14 housing the stator winding 16A, fixing the stator winding 16A to the stator core 15A.

The a-phase, b-phase, and c-phase winding phase portions 30a, 30b, and 30c constructed in this manner are formed into a Y-connection (an alternating-current connection), constituting a first three-phase alternating-current winding 160A, and the d-phase, e-phase, and f-phase winding phase portions 30d, 30e, and 30f are formed into a Y-connection (an alternating-current connection), constituting a second three-phase alternating-current winding 160B. The stator winding 16A is constituted by the first and second three-phase alternating-current windings 160A and 160B. The first and second three-phase alternating-current windings 160A and 160B are each connected to separate rectifiers 12, constituting the electrical circuit shown in FIG. 4.

Moreover, the a-phase, b-phase, and c-phase winding phase portions 30a, 30b, and 30c are each given a phase difference corresponding to an electrical angle of 60°, and the d-phase, e-phase, and f-phase winding phase portions 30d, 30e, and 30f are each given a phase difference corresponding to an electrical angle of 60°. In addition, the d-phase, e-phase, and f-phase winding phase portions 30d, 30e, and 30f are given a phase difference corresponding to an electrical angle of 30° relative to the a-phase, b-phase, and c-phase winding phase portions 30a, 30b, and 30c, respectively.

In an automotive alternator constructed in this manner, a rotating magnetic field is applied to the stator core 15A due to the rotation of the rotor 7A, generating an electromotive force in the first and second three-phase alternating-current windings 160A and 160B of the stator winding 16A. The alternating electromotive force generated in the first and second three-phase alternating-current windings 160A and 160B is converted into direct current by the respective rectifier 12, and the magnitudes of the voltages output therefrom are adjusted by the regulator 18. Then, the output from each of the rectifiers 12 is combined, recharging the battery.

According to Embodiment 1, because the ratio (t/h) between the amount of axial protrusion t of the centrifugal fans 38 relative to the apex portions of the front-end and rear-end coil end groups 16f and 16r of the stator winding 16A and the axial height h of the centrifugal fans 38 is 0.5, inflow flow rates of the cooling airflows are ensured, enabling temperature increases in the diodes 24a of the rectifiers 12 to be lowered without detracting from the cooling of the front-end and rear-end coil end groups 16f and 16r. Thus, because heat degradation in the diodes 24a is suppressed, the life of the diodes 24a can be extended. In addition, because temperature increases in the stator 8A are suppressed, softening of the varnish is suppressed, preventing damage to the electrically-insulating coating on the conductor wires of the stator winding 16A resulting from the conductor wires of the stator winding 16A rubbing against the stator core 15A, thereby improving electrical insulation.

Because the centrifugal fans 38 are constructed so as to have smaller outside diameters than the first and second pole cores 20A and 21A, a radial distance between the front-end centrifugal fan 38 and the front-end coil end group 16f increases, and a radial distance between the rear-end centrifugal fan 38 and the rear-end coil end group 16r increases, thereby lowering wind noise resulting from interference between the front-end centrifugal fan 38 and the front-end coil end group 16f and between the rear-end centrifugal fan 38 and the rear-end coil end group 16r.

Because the first and second curved shoulder portions 20a and 21a are formed on the first and second pole cores 20A and 21A, wind-splitting noise generated by the first and second curved shoulder portions 20a and 21a is ameliorated, lowering wind noise.

Because the slots 14 are formed at a ratio of two per phase per pole, the amount of time that a tooth formed between the slots 14 overlaps an adjacent pair of the magnetic poles relative to a radial direction is shortened. As a result, magnetic flux leakage is lowered, suppressing decreases of effective magnetic flux. In addition, generation of surges in the magnetic flux is suppressed, reducing fluctuations in generated voltage and output waveform disturbances, thereby reducing ripples when alternating current is converted into direct current.

Figure 5:
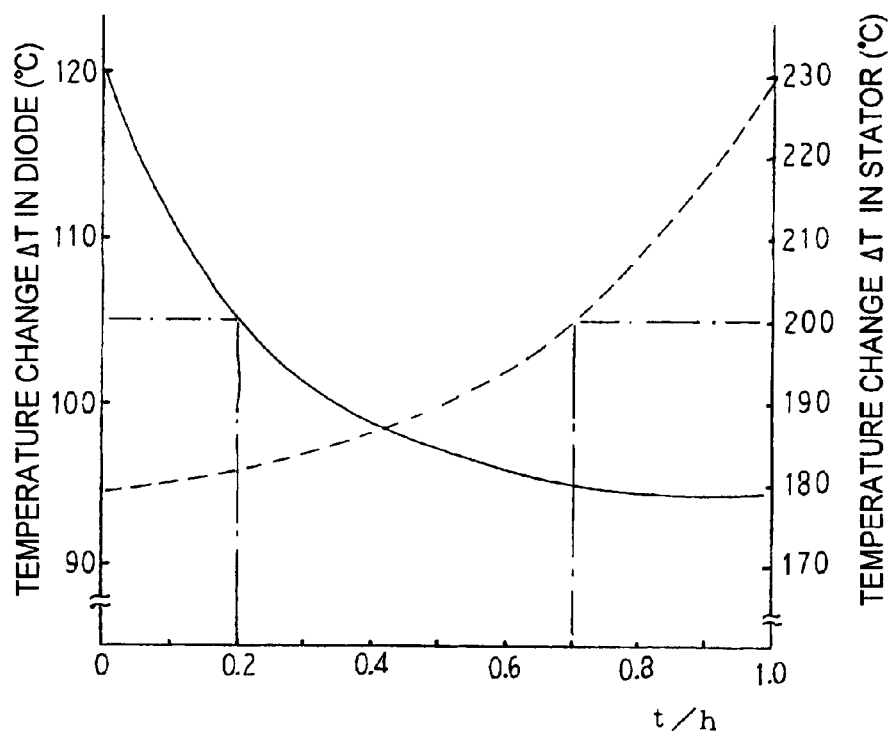
FIG. 5 is a graph showing relationships between t/h and temperature change $\Delta T$ in a diode and between t/h and temperature change $\Delta T$ in the stator in the automotive alternator according to Embodiment 1 of the present invention.

Now, a relationship between the amount of axial protrusion t of the centrifugal fans 38 relative to the apex portions of the front-end and rear-end coil end groups 16f and 16r of the stator winding 16A and the axial height h of the centrifugal fans 38 will be investigated. FIG. 5 shows values of increases in saturation temperatures from an ambient temperature when power was generated at full load under stable output conditions in an automotive alternator mounted with the stator 8A in which the height of the apex portions of the front-end and rear-end coil end groups 16f and 16r of the stator winding 16A was varied, and the saturation temperatures of the stator 8A and the rectifiers 12 (the diodes 24a) were measured. Moreover, in FIG. 5, the ratio (t/h) between the amount of axial protrusion t of the centrifugal fans 38 and the axial height h of the centrifugal fans 38 is represented on the horizontal axis, and temperature changes $\Delta T$ (° C.) in the diodes 24a and the stator 8A from the ambient temperature of the experiment (20° C.) are represented on first and second vertical axes, respectively. The temperature change $\Delta T$ in the stator 8A is indicated by a broken line, and the temperature change $\Delta T$ in the diodes 24a is indicated by a solid line. Furthermore, the automotive alternator was operated at 2000, 2500, 3000, 4000, and 5000 rpm, the saturation temperatures of the stator 8A and the diodes 24a were measured, and the largest values in the measured saturation temperatures were used as the saturation temperatures of the stator 8A and the diodes 24a. Furthermore, t/h=1 is when the apex portions of the front-end and rear-end coil end groups 16f and 16r align with the front-end and rear-end axial end surfaces (front-end and rear-end fan-mounting surfaces) of the first and second pole cores 20A and 21A of the rotor 7A, and t/h=0 is when the apex portions of the front-end and rear-end coil end groups 16f and 16r align with axially-outer front-end and rear-end end surfaces (fan heights) of the centrifugal fans 38.

It can be seen from FIG. 5 that the temperature change $\Delta T$ in the diodes 24a registers 120° C. when t/h is 0, drops rapidly as t/h is increased, decreases slowly when t/h exceeds 0.6, and is 95° C. when t/h is 1. It is inferred from this that when t/h=0, ventilation resistance is at a maximum and the inflow flow rates of the cooling airflows are at a minimum because the front-end and rear-end coil end groups 16f and 16r overlap radially with the entire axial region of the centrifugal fans 38, and the diodes 24a are not being cooled effectively. It is also inferred that as t/h increases, the ventilation resistance decreases and the inflow flow rates of the cooling airflows increases, thereby improving cooling of the diodes 24a and suppressing temperature increases in the diodes 24a.

In an actual automotive alternator, the ambient temperature is 90° C. under the worst operating conditions. Furthermore, the heat tolerance threshold of the diodes 24a is 165° C. Thus, if the temperature change $\Delta T$ at the ambient temperature of 90° C. is suppressed to 75° C. or less, the temperature of the diodes 24a can be prevented from exceeding the heat tolerance threshold even under the worst operating conditions. If decreases in output resulting from reduced field current due to ambient temperature increases are taken into consideration, a temperature change $\Delta T$ of 75° C. at an ambient temperature of 90° C. corresponds to a temperature change $\Delta T$ of 105° C. (t/h=0.2) at an ambient temperature of 20° C. Consequently, in consideration of the life (or of heat degradation) of the diodes 24a, it is desirable to set t/h so as to be greater than 0.2.

On the other hand, it can be seen from FIG. 5 that the temperature change $\Delta T$ in the stator 8 registers 180° C. when t/h is 0, increases slowly as t/h is increased, increases somewhat steeply when t/h exceeds 0.6, and is 230° C. when t/h is 1. It is inferred from this that when t/h=0, almost all of the cooling airflow deflected centrifugally by the front-end and rear-end centrifugal fans 38 is supplied to the front-end and rear-end coil end groups 16f and 16r because the front-end and rear-end coil end groups 16f and 16r overlap radially with the entire axial region of the centrifugal fans 38, effectively cooling the stator winding 16. It is also inferred that as t/h increases, cooling of the front-end and rear-end coil end groups 16f and 16r deteriorates and the temperature of the stator 8 increases because the amount of cooling airflow supplied to the front-end and rear-end coil end groups 16f and 16r by the centrifugal fans 38 is reduced as a result of the overlap between the front-end coil end group 16f and the front-end centrifugal fan 38 and between the rear-end coil end group 16r and the rear-end centrifugal fan 38 decreasing.

Now, since the softening temperature of the varnish is 260° C., if the temperature change $\Delta T$ at the ambient temperature of 90° C. is suppressed to 170° C. or less, the temperature of the stator 8 can be prevented from exceeding the softening temperature of the varnish even under the worst operating conditions. If decreases in output resulting from reduced field current due to ambient temperature increases are taken into consideration, a temperature change $\Delta T$ of 170° C. at an ambient temperature of 90° C. corresponds to a temperature change $\Delta T$ of 200° C. (t/h=0.7) at an ambient temperature of 20° C. Consequently, in consideration of softening of the varnish, it is desirable to set t/h to less than 0.7. Thus, deterioration of electrical insulation resulting from loosening of the bonding between the stator winding 16A and the stator core 15A is suppressed.

Thus, by making 0.2<t/h<0.7, an automotive alternator can be achieved in which the life of the diodes 24*a* can be extended and the deterioration of electrical insulation is suppressed.

Figure 6:
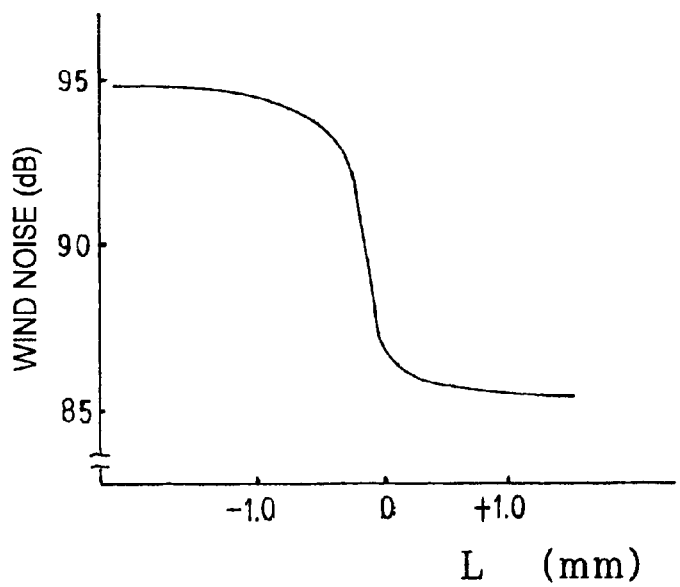
FIG. 6 is a graph showing a relationship between L and wind noise in the automotive alternator according to Embodiment 1 of the present invention.

Next, a relationship between an axial distance L and wind noise will be investigated, the axial distance L being measured between end surfaces of the front-end crossover portions 16*b* of the front-end coil end group 16*f* of the stator winding 16A nearest to the stator core 15A and a front-end fan-mounting surface, and between end surfaces of the rear-end crossover portions 16*b* of the rear-end coil end group 16*r* of the stator winding 16A nearest to the stator core 15A and a rear-end fan-mounting surface. FIG. 6 shows measured results for wind noise in an automotive alternator when operated at 10,000 rpm, the automotive alternator being mounted with the stator 8A, in which the axial height of the gaps G between the front-end and rear-end crossover portions 16*b* of the front-end and rear-end coil end groups 16*f* and 16*r* and the front-end and rear-end end surfaces of the stator core 15A was varied. Moreover, in FIG. 6, the axial distance L (mm) between the end surfaces of the front-end crossover portions 16*b* nearest to the stator core 15A and the front-end fan-mounting surface and between the end surfaces of the rear-end crossover portions 16*b* nearest to the stator core 15A and the rear-end fan-mounting surface is represented on the horizontal axis, and an overall value of wind noise (dB) is represented on the vertical axis. Furthermore, L=0 is when the end surfaces of the crossover portions 16*b* nearest to the stator core 15A align with the front-end and rear-end fan-mounting surfaces, respectively, L>0 is when the entire axial region of the gaps G overlaps the first and second pole cores 20A and 21A in a radial direction, and L<0 is when at least a portion of the gaps G overlaps the centrifugal fans 38 in a radial direction.

It can be seen from FIG. 6 that when at least a portion of the gaps G overlaps the centrifugal fans 38 in a radial direction (L<0), a generally constant loud wind noise (95 dB) is generated, but that wind noise decreases rapidly in a general region where L=0, and that wind noise is generally constant (85 dB) at L>0. Wind noise is generated by interference between circumferential irregularities in the front-end and rear-end coil end groups 16*f* and 16*r* and the centrifugal fans 38. Wind noise resulting from the circumferential irregularities constituted by the gaps G, which appear repeatedly in the circumferential direction, is approximately 10 dB. Thus, the wind noise resulting from the circumferential irregularities constituted by the gaps G is prevented by reducing radial overlap between the gaps G and the centrifugal fans 38.

Consequently, it is desirable to make L>0 in order to lower wind noise.

Now, the number of gaps G increases as the number of slots increases. The frequency generated by the wind noise resulting from the circumferential irregularities constituted by the gaps G rises as the gaps G increase in number. In other words, the wind noise becomes high order wind noise, that is, unpleasantly irritating noise. By making L>0, generation of such unpleasantly irritating noise can be suppressed. The effect of preventing the generation of unpleasantly irritating noise by making L>0 becomes evident when the slots are disposed at a ratio of two or more per phase per pole. Furthermore, even when the slots are disposed at a ratio of one per phase per pole, making L>0 when there is a large number of slots (number of magnetic poles: 16; number of slots: 48) is an effective countermeasure from the viewpoint of suppressing the generation of unpleasantly irritating noise.

Moreover, in Embodiment 1 above, the six winding phase portions 30*a* to 30*f* are installed in the stator core 15A so as to line up from an outer circumferential side in order of the a-phase winding phase portion 30*a*, the b-phase winding phase portion 30*b*, the c-phase winding phase portion 30*c*, the f-phase winding phase portion 30*f*, the d-phase winding phase portion 30*d*, and the e-phase winding phase portion 30*e*. However, the six winding phase portions 30*a* to 30*f* are not limited to this installation order.

Embodiment 2

Figure 7:
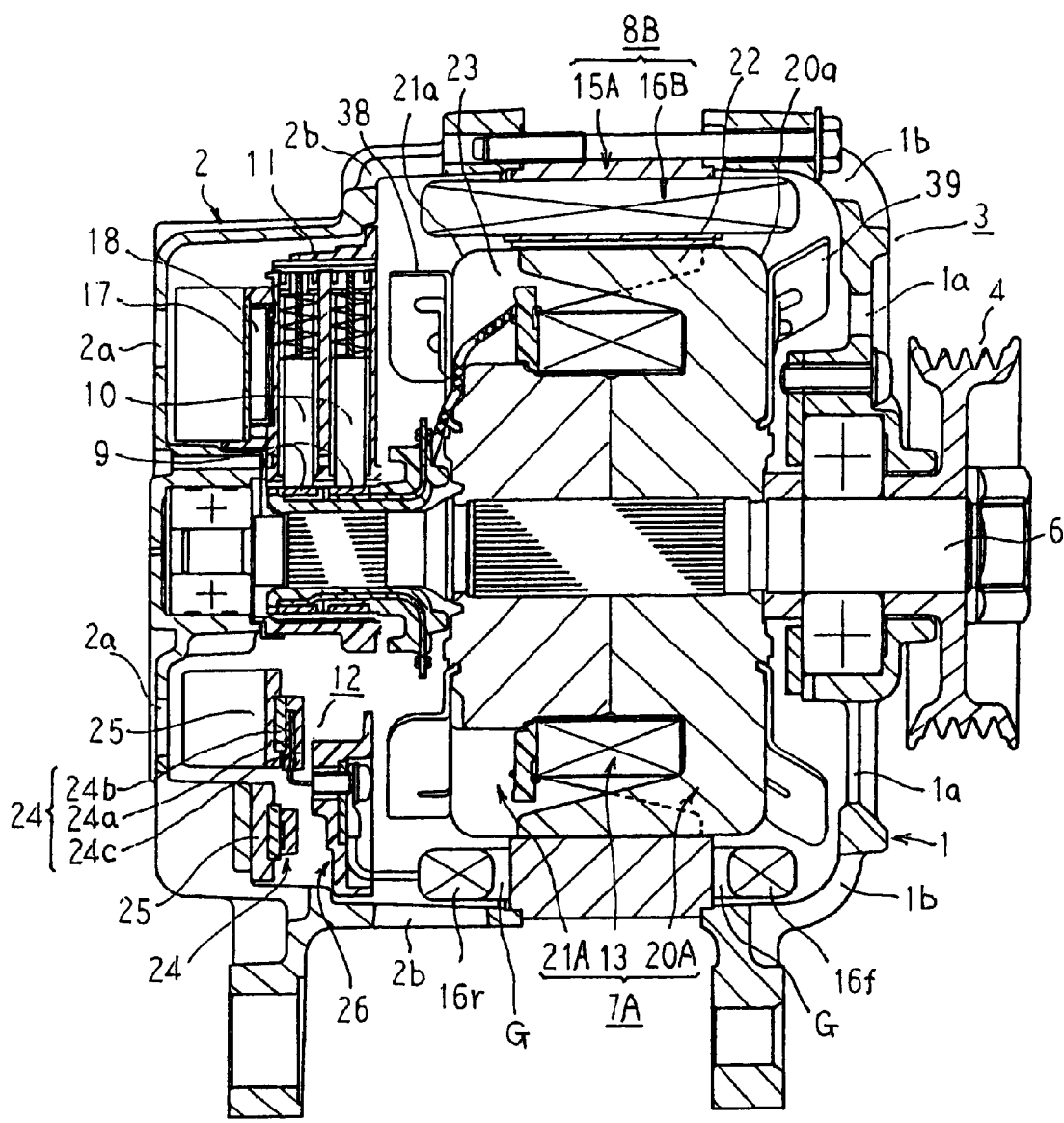
FIG. 7 is a cross section showing an automotive alternator according to Embodiment 2 of the present invention.
Figure 8:
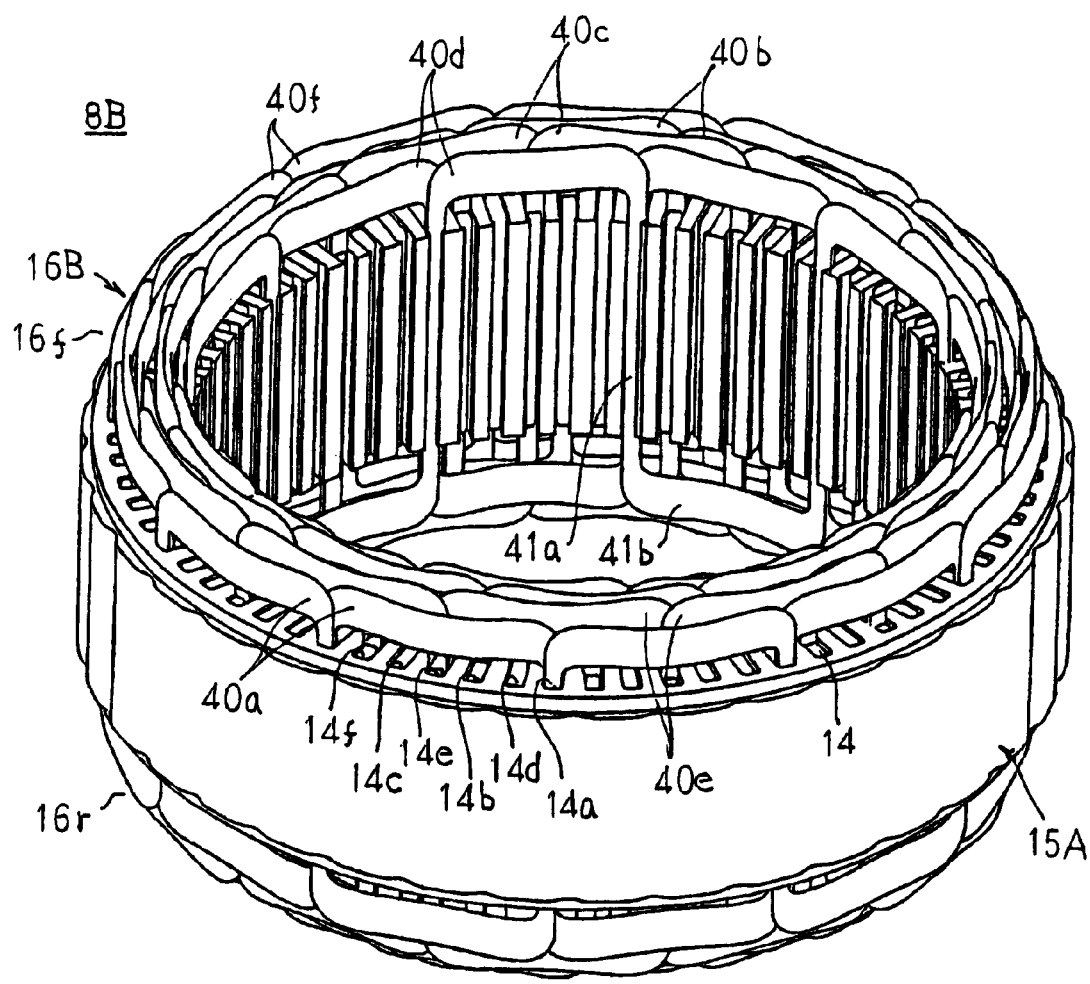
FIG. 8 is a perspective showing a stator of the automotive alternator according to Embodiment 2 of the present invention.
Figure 9:
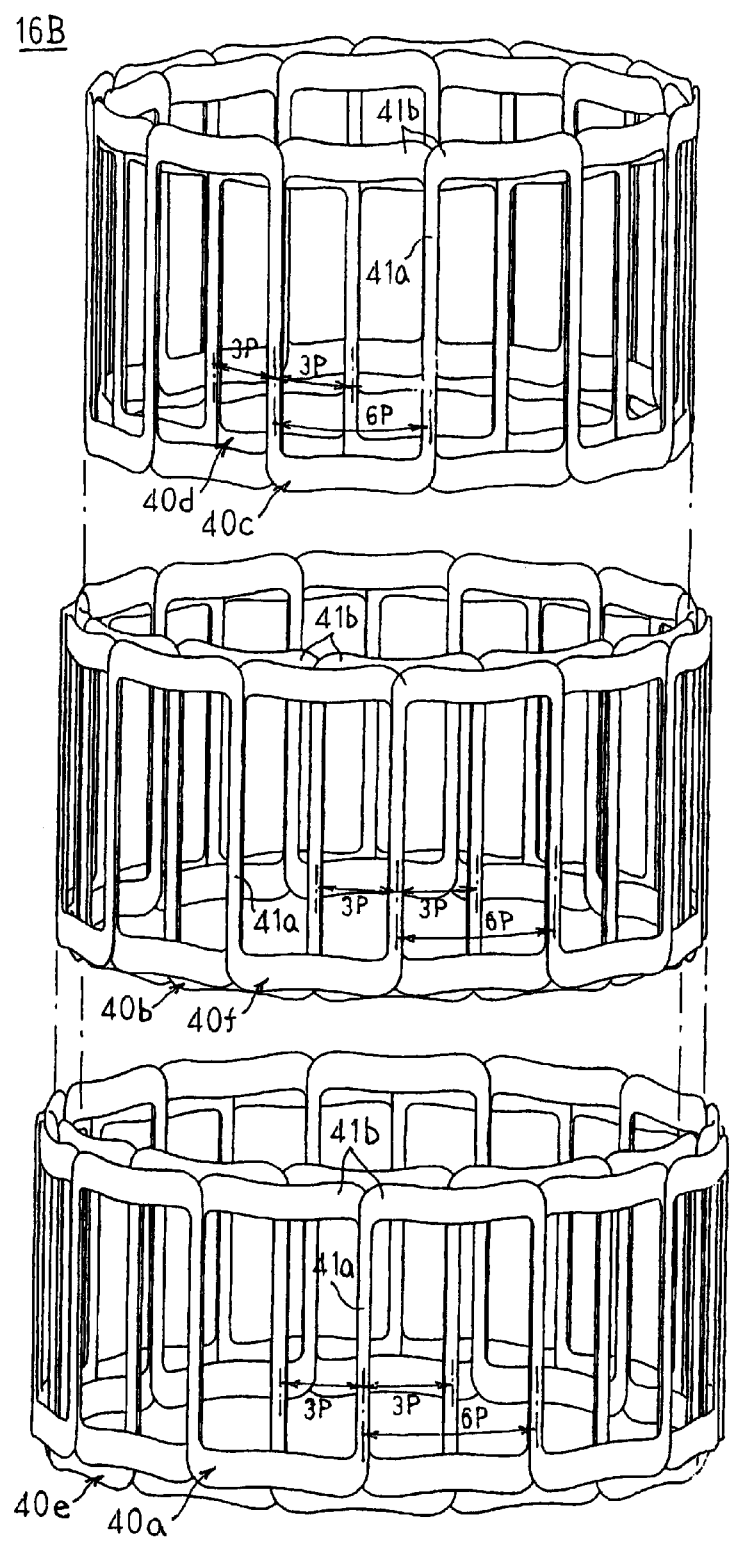
FIG. 9 is an exploded perspective of a stator winding installed in the stator of the automotive alternator according to Embodiment 2 of the present invention.

FIG. 7 is a cross section showing an automotive alternator according to Embodiment 2 of the present invention, FIG. 8 is a perspective showing a stator of the automotive alternator according to Embodiment 2 of the present invention, and FIG. 9 is an exploded perspective of a stator winding installed in the stator of the automotive alternator according to Embodiment 2 of the present invention.

In the automotive alternator according to Embodiment 2 in FIG. 7, a mixed-flow fan 39 functioning as a cooling fan is fixed to the axial end surface (the fan-mounting surface) of the first pole core 20A. A stator 8B is constituted by the stator core 15A, and a stator winding 16B installed in the stator core 15A. As described below, each of the winding phase portions of the stator winding 16B is installed in the stator core 15A as a divided winding portion.

Moreover, the rest of the embodiment is constructed in a similar manner to Embodiment 1 above.

A construction of the stator winding 16B will now be explained with reference to FIGS. 8 and 9.

An a-phase winding phase portion 40*a* is constructed into a wave winding in which a conductor wire composed of a continuous copper wire coated with electrical insulation is wound for a predetermined number of winds, and as shown in FIG. 9, the a-phase winding phase portion 40*a* is formed into a divided winding portion having a wave-shaped pattern composed of twelve slot-housed portions 41*a* disposed at a pitch of six slots (6P) in a circumferential direction and linking portions 41*b* linking together a first half of end portions of adjacent pairs of the slot-housed portions 41*a* alternately at first and second axial ends and linking together a second half of the end portions alternately at the first and second axial ends. The a-phase winding phase portion 40*a* is installed in the stator core 15A such that the slot-housed portions 41*a* are housed in the respective a-phase slots 14*a* disposed at the pitch of six slots. The linking portions 41*b* linking together the end portions of the adjacent pairs of the slot-housed portions 41*a* extend circumferentially axially outside the stator core 15A, constituting coil ends. Here, a first half of the linking portions 41*b* extending outwards from any given a-phase slot 14*a* extends to a first circumferential side and enters a subsequent a-phase slot 14*a* on the first circumferential side, and a second half thereof extends to a second circumferential side and enters a subsequent a-phase slot 14*a* on the second circumferential side.

Furthermore, b-phase, c-phase, d-phase, e-phase, and f-phase winding phase portions 40*b*, 40*c*, 40*d*, 40*e*, and 40*f* are constructed in a similar manner.

The a-phase and e-phase winding phase portions 40a and 40e are circumferentially offset from each other by a pitch of three slots (3P) and stacked in two layers radially, and installed in the stator core 15A so as to constitute two layers on an outer circumferential side in a radial direction. Similarly, the d-phase and c-phase winding phase portions 40d and 40c are circumferentially offset from each other by a pitch of three slots and stacked in two layers radially, and installed in the stator core 15A so as to constitute two layers in an intermediate portion in the radial direction. In addition, the b-phase and f-phase winding phase portions 40b and 40f are circumferentially offset from each other by a pitch of three slots and stacked in two layers radially, and installed in the stator core 15A so as to constitute two layers on an inner circumferential side in the radial direction.

Thus, as shown in FIG. 8, the stator 8B is obtained, in which the six winding phase portions 40a to 40f are installed in the stator core 15A so as to be stacked in six layers radially. Here, the six winding phase portions 40a to 40f are installed in the stator core 15A so as to line up from the outer circumferential side in order of the a-phase winding phase portion 40a, the e-phase winding phase portion 40e, the d-phase winding phase portion 40d, the c-phase winding phase portion 40c, the b-phase winding phase portion 40b, and the f-phase winding phase portion 40f. The coil ends (the linking portions 41b) of the six winding phase portions 40a to 40f constitute front-end and rear-end coil end groups 16f and 16r of the stator winding 16B. Furthermore, portions of the coil ends extending circumferentially relative to the stator core 15A form front-end and rear-end crossover portions, and gaps G are formed between the front-end and rear-end crossover portions and the front-end and rear-end end surfaces of the stator core 15A.

The a-phase, b-phase, and c-phase winding phase portions 40a, 40b, and 40c constructed in this manner are formed into a Y-connection (an alternating-current connection), constituting a first three-phase alternating-current winding, and the d-phase, e-phase, and f-phase winding phase portions 40d, 40e, and 40f are formed into a Y-connection (an alternating-current connection), constituting a second three-phase alternating-current winding. The first and second three-phase alternating-current windings are each connected to separate rectifiers 12, constituting a similar electrical circuit to the electrical circuit shown in FIG. 4.

Moreover, the a-phase, b-phase, and c-phase winding phase portions 40a, 40b, and 40c are each given a phase difference corresponding to an electrical angle of 60°, and the d-phase, e-phase, and f-phase winding phase portions 40d, 40e, and 40f are each given a phase difference corresponding to an electrical angle of 60°. In addition, the d-phase, e-phase, and f-phase winding phase portions 40d, 40e, and 40f are given a phase difference corresponding to an electrical angle of 30° relative to the a-phase, b-phase, and c-phase winding phase portions 40a, 40b, and 40c, respectively.

The stator 8B constructed in this manner is mounted to the automotive alternator in place of the stator 8A and operates in a similar manner to Embodiment 1 above.

In Embodiment 2, because the front-end cooling fan is constituted by the mixed-flow fan 39, the cooling airflow which flows in through the front-end air intake aperture 1a is made to flow radially outward and axially rearward by the mixed-flow fan 39. Hence, the flow rate of the cooling airflow flowing through the inside of the rotor 7A from the front end to the rear end is ensured, reliably cooling the field winding 13. Thus, temperature increases in the field winding 13 are suppressed, enabling improved output.

Because the winding phase portions 40a to 40f constituting the stator winding 16B are each constituted by divided winding portions, the linking portions 41b (coil ends) of each of the winding phase portions 40a to 40f extending from the slots 14 are divided in half onto the first and second circumferential sides. Hence, radial overlap between bundles of the conductor wires constituting the winding phase portions 40a to 40f in the vicinity of where the winding phase portions 40a to 40f bend circumferentially after extending from the slots 14 is distributed circumferentially, reducing radial expansion of the coil end groups 16f and 16r. Thus, because circumferential irregularities in the coil end groups 16f and 16r are reduced, wind noise resulting from pressure fluctuations between the coil end groups 16f and 16r and the rotor 7A and between the coil end groups 16f and 16r and the cooling fans (the centrifugal fan 38 and the mixed-flow fan 39) can be reduced.

In addition, the six winding phase portions 40a to 40f are installed in the stator core 15A so as to line up from the outer circumferential side in order of the a-phase winding phase portion 40a, the e-phase winding phase portion 40e, the d-phase winding phase portion 40d, the c-phase winding phase portion 40c, the b-phase winding phase portion 40b, and the f-phase winding phase portion 40f.

Now, because the winding phase portions constituting the first three-phase alternating-current winding and the winding phase portions constituting the second three-phase alternating-current winding are lined up alternately in a radial direction, the coil ends (the linking portions 41b) of the first three-phase alternating-current winding and the coil ends (the linking portions 41b) of the second three-phase alternating-current winding are arranged in a balanced manner in the radial direction. Thus, the coil ends of the first three-phase alternating-current winding and the coil ends of the second three-phase alternating-current winding are uniformly cooled by the cooling airflows supplied by the cooling fans 38 and 39, enabling temperature increases in the stator 8B to be suppressed by preventing the temperature of either of the three-phase alternating-current windings from increasing excessively.

The a-phase winding phase portion 40a and the e-phase winding phase portion 40e, which constitute a pair of layers on the outer circumferential side in the radial direction, are arranged such that the linking portions 41b of the e-phase winding phase portion 40e extend outward from the e-phase slots 14e at a circumferentially-central portions of the linking portions 41b of the a-phase winding phase portion 40a. Thus, portions of the coil ends in the vicinity of where the a-phase winding phase portion 40a and the e-phase winding phase portion 40e are bent circumferentially after extending from the slots 14 (portions where radial expansion is greatest) are maximally separated in the circumferential direction.

Similarly, the d-phase winding phase portion 40d and the c-phase winding phase portion 40c, which constitute a pair of layers in the intermediate portion in the radial direction, are arranged such that the linking portions 41b of the d-phase winding phase portion 40d extend outward from the d-phase slots 14d at circumferentially-central portions of the linking portions 41b of the c-phase winding phase portion 40c. Thus, portions of the coil ends in the vicinity of where the d-phase winding phase portion 40d and the c-phase winding phase portion 40c are bent circumferentially after extending from the slots 14 are maximally separated in the circumferential direction.

In addition, the b-phase winding phase portion 40b and the f-phase winding phase portion 40f, which constitute a pair of layers on the inner circumferential side in the radial direction, are arranged such that the linking portions 41b of the f-phase winding phase portion 40f extend outward from the f-phase slots 14f at circumferentially-central portions of the linking portions 41b of the b-phase winding phase portion 40b. Thus, portions of the coil ends in the vicinity of where the b-phase winding phase portion 40b and the f-phase winding phase portion 40f are bent circumferentially after extending from the slots 14 are maximally separated in the circumferential direction.

As a result, radial expansion of the coil end groups 16f and 16r is reduced. Thus, because circumferential irregularities in the coil end groups 16f and 16r are reduced, wind noise resulting from pressure fluctuations between the coil end groups 16f and 16r and the rotor 7A and between the coil end groups 16f and 16r and the cooling fans 38 and 39 can be reduced.

Now, in Embodiment 2 above, the six winding phase portions 40a to 40f are installed in the stator core 15A so as to line up from the outer circumferential side in order of the a-phase winding phase portion 40a, the e-phase winding phase portion 40e, the d-phase winding phase portion 40d, the c-phase winding phase portion 40c, the b-phase winding phase portion 40b, and the f-phase winding phase portion 40f. However, the six winding phase portions 40a to 40f are not limited to this installation order.

Moreover, in each of the above embodiments, the d-phase, e-phase, and f-phase winding phase portions 30d, 30e, and 30f are given a phase difference corresponding to an electrical angle of 30° relative to the a-phase, b-phase, and c-phase winding phase portions 30a, 30b, and 30c, respectively, but the phase difference between the d-phase, e-phase, and f-phase winding phase portions 30d, 30e, and 30f and the a-phase, b-phase, and c-phase winding phase portions 30a, 30b, and 30c is not limited to (an electrical angle of) 30°; the phase difference between the two may also be (an electrical angle of) 32.5°, for example. In that case, twelfth order electromagnetic vibrational forces, which are a cause of unpleasant higher harmonic noise, are reduced.

Each of the above embodiments has been explained with reference to stator cores in which slots are disposed at a ratio of two per phase per pole, but similar effects can also be achieved if the present invention is applied to stator cores in which the slots are disposed at a ratio of one per phase per pole, or three or more per phase per pole.

In each of the above embodiments a wave winding composed of one conductor wire is used in each of the winding phase portions of the stator winding, but in the present invention, the winding phase portions are not limited to a wave winding composed of one conductor wire; a wave winding constructed by linking short conductor segments, for example, may also be used.

The present invention is constructed in the above manner and exhibits the effects described below.

According to one aspect of the present invention, there is provided an automotive alternator including:
a shaft rotatably supported by a case;
a rotor fixed to the shaft;
a stator provided with:
  a cylindrical stator core supported by the case so as to envelop the rotor, a plurality of slots extending axially being formed in the stator core so as to line up circumferentially; and
  a stator winding installed in the stator core;
a rectifier supported by the case so as to face an axial end surface of the rotor; and
at least one cooling fan fixed to at least one axial end surface of the rotor,
wherein the cooling fan is constructed such that a ratio (t/h) between an amount of axial protrusion t of the cooling fan relative to an apex portion of a coil end group of the stator winding and an axial height h of the cooling fan satisfies an expression $0.2<t/h<0.7$, thereby providing an automotive alternator in which deterioration in electrical insulation resulting from damage to an electrically-insulating coating on conductor wires is suppressed, and the working life of diodes is extended.

A gap may be formed between the coil end group of the stator winding and an end surface of the stator core, the gap being positioned closer to an axially-central region than the end surface of the rotor to which the cooling fan is fixed, suppressing the generation of unpleasantly irritating noise resulting from the gap.

Each of winding phase portions constituting the stator winding may be constructed by a divided winding portion, reducing circumferential irregularities in the coil end group, thereby reducing wind noise resulting from the circumferential irregularities.

The cooling fan may be formed so as to have a smaller outside diameter than an outside diameter of the rotor, ensuring radial distance between the fan and the coil end group, thereby lowering wind noise.

An intersecting region between an axial end surface of the rotor and an outer circumferential surface of the rotor may be chamfered, reducing wind-splitting noise.

The cooling fans may be fixed to first and second axial end surfaces of the rotor, the cooling fan fixed to the first axial end surface of the rotor being a centrifugal fan, and the cooling fan fixed to the second axial end surface of the rotor being a mixed-flow fan, whereby a cooling airflow flowing through the inside of the rotor is reliably ensured, suppressing temperature increases in a field winding, thereby enabling output to be improved.

The slots may be disposed at a ratio of two per phase per pole, reducing magnetic flux leakage, thereby suppressing decreases in effective magnetic flux, and also reducing ripples when alternating current is converted into direct current.

What is claimed is:

1. An automotive alternator comprising:
a shaft rotatably supported by a case;
a rotor fixed to said shaft;
a stator provided with:
  a cylindrical stator core supported by said case so as to envelop said rotor, a plurality of slots extending axially being formed in said stator core so as to line up circumferentially; and
  a stator winding installed in said stator core;
a rectifier supported by said case so as to face an axial end surface of said rotor; and
at least one cooling fan fixed to at least one axial end surface of said rotor,
wherein said cooling fan is constructed such that a ratio (t/h) between an amount of axial protrusion t of said cooling fan relative to an apex portion of a coil end group of said stator winding and an axial height h of said cooling fan satisfies an expression $0.2<t/h<0.7$.

2. The automotive alternator according to claim 1 wherein a gap is formed between said coil end group of said stator winding and an end surface of said stator core, said gap being positioned closer to an axially-central region than said axial end surface of said rotor to which said cooling fan is fixed.

3. The automotive alternator according to claim 1 wherein each of winding phase portions constituting said stator winding is constructed by a divided winding portion.

4. The automotive alternator according to claim 1 wherein said cooling fan is formed so as to have a smaller outside diameter than an outside diameter of said rotor.

5. The automotive alternator according to claim 4 wherein an intersecting region between an axial end surface of said rotor and an outer circumferential surface of said rotor is chamfered.

6. The automotive alternator according to claim 1 comprising a plurality of said cooling fans, each one being respectively fixed to first and second axial end surfaces of said rotor, said cooling fan fixed to said first axial end surface of said rotor being a centrifugal fan, and said cooling fan fixed to said second axial end surface of said rotor being a mixed-flow fan.

7. The automotive alternator according to claim 1 wherein said slots are disposed at a ratio of two per phase per pole.

* * * * *